(12) United States Patent
Acar et al.

(10) Patent No.: US 11,148,522 B2
(45) Date of Patent: Oct. 19, 2021

(54) ASSEMBLY FOR AN UREA TANK SYSTEM

(71) Applicant: Ford Global Technologies, LLC, Dearborn, MI (US)

(72) Inventors: Alpaslan Acar, Pendik/Istanbul (TR); Mehmet Kalp, Ümraniye/Istanbul (TR); Okan Us, Atasehir/Istanbul (TR); Ahmet Kamil Ergan, Üsküdar/Istanbul (TR); Bayram Ozdemir, Atasehir/Istanbul (TR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/880,378

(22) Filed: May 21, 2020

(65) Prior Publication Data

US 2020/0384850 A1 Dec. 10, 2020

(30) Foreign Application Priority Data

Jun. 5, 2019 (EP) .................................... 19178315

(51) Int. Cl.
| | |
|---|---|
| *B60K 15/04* | (2006.01) |
| *B60K 13/04* | (2006.01) |
| *B67D 7/02* | (2010.01) |
| *F16L 9/18* | (2006.01) |
| *B60K 15/01* | (2006.01) |

(52) U.S. Cl.
CPC .............. *B60K 13/04* (2013.01); *B60K 15/01* (2013.01); *B60K 15/013* (2013.01); *B60K 15/04* (2013.01); *B67D 7/0288* (2013.01); *F16L 9/18* (2013.01)

(58) Field of Classification Search
CPC ...... B60K 15/01; B60K 15/04; B60K 15/013; B60K 2015/016; B60K 2015/0458; F16L 9/18
USPC .......................... 141/59, 285, 290; 220/86.2
See application file for complete search history.

(56) References Cited

U.S. PATENT DOCUMENTS

| | | | | | |
|---|---|---|---|---|---|
| 3,187,936 | A | * | 6/1965 | Downing ................ | B60K 15/04 220/86.2 |
| 4,122,968 | A | * | 10/1978 | Germain ................ | B60K 15/04 138/114 |
| 4,274,549 | A | * | 6/1981 | Germain .............. | B60K 15/035 138/113 |

(Continued)

FOREIGN PATENT DOCUMENTS

| | | |
|---|---|---|
| DE | 102016102737 A1 | 3/2017 |
| DE | 102017108009 B3 | 9/2018 |

(Continued)

OTHER PUBLICATIONS

European Patent Office, Extended European Search Report Issued in Application No. 19173158, dated Dec. 19, 2019, Germany, 5 pages.

*Primary Examiner* — Timothy L Maust
(74) *Attorney, Agent, or Firm* — Geoffrey Brumbaugh; McCoy Russell LLP

(57) ABSTRACT

Systems are provided for an assembly for a urea tank system. In one example, coaxial tubes including an inner tube and an outer tube are used to separate a urea passage from a gas passage. An angled tube, which extends from a urea tank to a portion of the outer tube downstream of a filler head relative to a direction of urea flow directs gases from the urea tank to the gas passage. This decreases a packaging size of the urea tank system.

20 Claims, 6 Drawing Sheets

(56) References Cited

U.S. PATENT DOCUMENTS

| | | | | |
|---|---|---|---|---|
| 4,722,454 A | * | 2/1988 | Fischer | B60K 15/04 137/587 |
| 4,770,677 A | * | 9/1988 | Harris | B60K 15/03504 141/286 |
| 4,836,835 A | * | 6/1989 | Harris | B60K 15/03504 96/113 |
| 5,131,439 A | * | 7/1992 | Bucci | B60K 15/04 141/285 |
| 5,271,438 A | * | 12/1993 | Griffin | B60K 15/04 141/59 |
| 5,497,809 A | * | 3/1996 | Wolf | F16L 9/18 138/113 |
| 5,538,039 A | * | 7/1996 | Harde | B60K 15/035 137/592 |
| 5,730,194 A | * | 3/1998 | Foltz | B60K 15/04 137/588 |
| 5,740,842 A | * | 4/1998 | Maier | B60K 15/03519 137/588 |
| 5,829,619 A | * | 11/1998 | Gupta | B60K 15/04 220/86.2 |
| 6,135,167 A | | 10/2000 | Kiholm | |
| 6,152,199 A | * | 11/2000 | Nusbaumer | B60K 15/04 137/588 |
| 6,523,582 B2 | * | 2/2003 | Furuta | B60K 15/04 141/286 |
| 7,198,078 B2 | * | 4/2007 | Miura | B60K 15/04 141/285 |
| 7,694,665 B2 | | 4/2010 | Ehrmann et al. | |
| 9,644,518 B2 | | 5/2017 | Ham et al. | |
| 9,669,706 B2 | * | 6/2017 | Koukan | B60K 15/04 |
| 9,701,531 B2 | * | 7/2017 | Desch | B67D 7/42 |
| 2009/0188923 A1 | | 7/2009 | Versaw, Jr. et al. | |
| 2010/0224284 A1 | | 9/2010 | Kolberg et al. | |
| 2013/0306665 A1 | | 11/2013 | Eberhardt et al. | |
| 2014/0190981 A1 | | 7/2014 | Netzer et al. | |
| 2016/0297669 A1 | | 10/2016 | Descsh | |
| 2017/0087982 A1 | * | 3/2017 | Sekihara | B60K 15/04 |
| 2018/0093877 A1 | * | 4/2018 | Hagano | B60K 15/04 |
| 2018/0105035 A1 | * | 4/2018 | Radu | B60K 15/04 |
| 2018/0126842 A1 | * | 5/2018 | Sekihara | B60K 15/035 |

FOREIGN PATENT DOCUMENTS

| | | |
|---|---|---|
| EP | 2340956 A2 | 7/2011 |
| EP | 2607133 A1 | 6/2013 |
| WO | 2012139631 A1 | 10/2012 |
| WO | 2013099312 A1 | 7/2013 |

\* cited by examiner

ASSEMBLY FOR AN UREA TANK SYSTEM

CROSS REFERENCE TO RELATED APPLICATIONS

The present application claims priority to European Patent Application No. 19178315.8 filed on Jun. 5, 2019. The entire contents of the above-listed application is hereby incorporated by reference for all purposes.

FIELD

The present description relates generally to an assembly comprising components of a urea tank system.

BACKGROUND/SUMMARY

Various urea tank systems, and parts thereof, in particular special filler heads for allowing a simultaneous urea flow towards the tank and for allowing a gas flow returning from the tank to escape in the environment, are known in the art.

As one example, U.S. application number 2014/0190981A1 relates to a filler head for a liquid tank in a motor vehicle, with a housing, with a first molded housing part formed therein, a tank vent pipe for introducing air into the housing; and a second molded housing part having formed therein a dip tube for guiding a jet of liquid in the interior of the filler head, the dip tube including a vent opening for discharging from the filler head the air that may be introduced through the tank vent pipe.

In another example, U.S. application number 2016/0297669A1 discloses a filling head having a filler stub for a pump nozzle, having a magnet element, which is formed from a magnetic plastics material, for releasing an automatic pump nozzle mechanism of the pump nozzle.

In a further example, U.S. application number 2013/0306665A1 relates to a filler neck for an auxiliary liquid reservoir for a motor vehicle, in particular for a urea reservoir, having a neck housing, which defines a mouth hole stub for a filler nozzle and a filling channel leading into the reservoir, wherein a receiving structure for a filler nozzle is provided within the neck housing.

In an additional example, U.S. Pat. No. 9,669,706 B2 discloses a filling device for a motor vehicle operating fluid container. The filling device comprises a mouth hole connection piece, into which a dispensing valve can be introduced in order to fill the operating fluid container, and a compensation chamber to which the mouth hole connection piece is connected in fluid terms.

In another example, DE 10 2016 102 737 A1 relates to a filler neck for receiving and forwarding a liquid, such as urea, wherein a backflow of the liquid in the filler tube causes the liquid to be pressed through a bypass and is conveyed into a filler neck.

In an additional example, U.S. Pat. No. 9,644,518 B2 discloses a urea filler neck for mitigating a likelihood of a urea overflow including a filler housing forming a urea path in which urea flows to a urea tank. An injection gun guide is provided in the filler housing. An end of an injection gun is fixed by the injection gun guide to limit an insertion position of the injection gun inserted into an inlet of the filler housing.

Another example includes EP 2 665 901 B1, which discloses a filler neck for a liquid tank, in particular a urea tank, on motor vehicles.

A further example includes EP 2 607 133 B1, which discloses a fill tube assembly having a dip tube that extends into a liquid storage container. A guide element is held on a lid locking structure of the liquid storage container. A vent guide is extended from an interior of liquid storage container to outside atmosphere.

An additional example includes DE 10 2017 108 009 B3, which describes a filler neck for a urea reservoir of a motor vehicle, with a first end for receiving a filler pipe, and a second end, which in the installed state is connected to the urea reservoir, an insert arranged at the first end, a magnet and a spring-loaded first flap. The filler neck at its first end has an interface for a Kruse bottle. The interface comprises an adapter plugged onto the filler neck.

An additional example is shown in EP 2 340 956 B1, which describes a fill support for a liquid tank, in particular a urea tank for a motor vehicle. The filling pipe has a connection piece and a detachable cover plate. The connection piece is coupleable directly or indirectly on a component of the motor vehicle or the stationary system or is connected with a fluid tank. The connection piece is equipped with an axially extending filling pipe section which is configured for receiving of the fuel pump nozzle for the fluidity and the attachable retaining of the bottle or canister filled with the fluid.

A further example is shown in U.S. application number 2010/0224284 A1 which relates to a reducing agent tank for motor vehicles, having at least one filler pipe which is provided with a filler opening, having at least one device for filling deaeration and having means for limiting the fill level during filling, with the device for filling deaeration comprising at least one filling deaeration line which extends at least in sections above the maximum fill level in the filler pipe and/or in the tank.

An example shown in U.S. Pat. No. 6,135,167 A discloses a method and apparatus for a filler valve. Another example is shown in U.S. Pat. No. 7,694,665 B2, which discloses a liquid vapor separator for a vehicle's fuel system, comprising a body having an inlet connectable with a venting system of a fuel tank and a vapor outlet connectable to a fuel vapor treating device, and a condensation space for condensation of fuel droplets, said space being in flow communication with said inlet and with said outlet, and said condensation space extending at or being in flow communication with a filler neck of the fuel system.

With regard to the previous example, the urea systems described therein may be difficult to install. The urea system of the present disclosure may be easier to install relative to the previous examples. More specifically, it is a particular object of the present disclosure to provide an assembly for use in a urea tank system comprising conduits which are easier to route in certain motor vehicles having limited space and having obstructions between the position for the urea tank and the inlet position.

It is also an object of the present invention to provide a urea tank system comprising such an assembly, and to a filler head, and to a filler pipe with an adapter as can be used in such an assembly. In one example, an assembly for a urea tank system, comprises a filler head comprising an opening with a plurality of grooves at a first end, the filler head further comprising an inner tubular portion and an outer tubular portion at a second end, wherein the inner tubular portion is fluidly coupled to the opening and the outer tubular portion is fluidly coupled to spaces between grooves of the plurality of grooves, a coaxial tube comprising an inner tube spaced away from an outer tube, wherein an interior volume of the inner tube is fluidly coupled to the inner tubular portion of the second end, and wherein a gap between the inner tube and the outer tube is fluidly coupled to the outer tubular portion of the second end, an adapter comprising a first tubular end comprising an adapter inner tubular portion and an adapter outer tubular portion arranged coaxially and spaced apart from one another, where the adapter inner tubular portion is connected to the inner tube of the coaxial tube and the adapter outer tubular portion is coupled to the outer tube of the coaxial tube, an angled tube is fluidly coupled to a gap arranged between the adapter inner tubular portion and the adapter outer tubular portion, wherein the angled tube is fluidly coupled to a gas outlet of a urea tank, and a urea inlet of the urea tank fluidly coupled to an outlet of the adapter inner tubular portion.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8b shows a cross-section view of the filler head in greater detail relative to FIG. 8a.

FIGS. 2-3 and 6-8b are drawn to scale, however, other relative dimensions may be used if desired.

DETAILED DESCRIPTION

Figure 1:
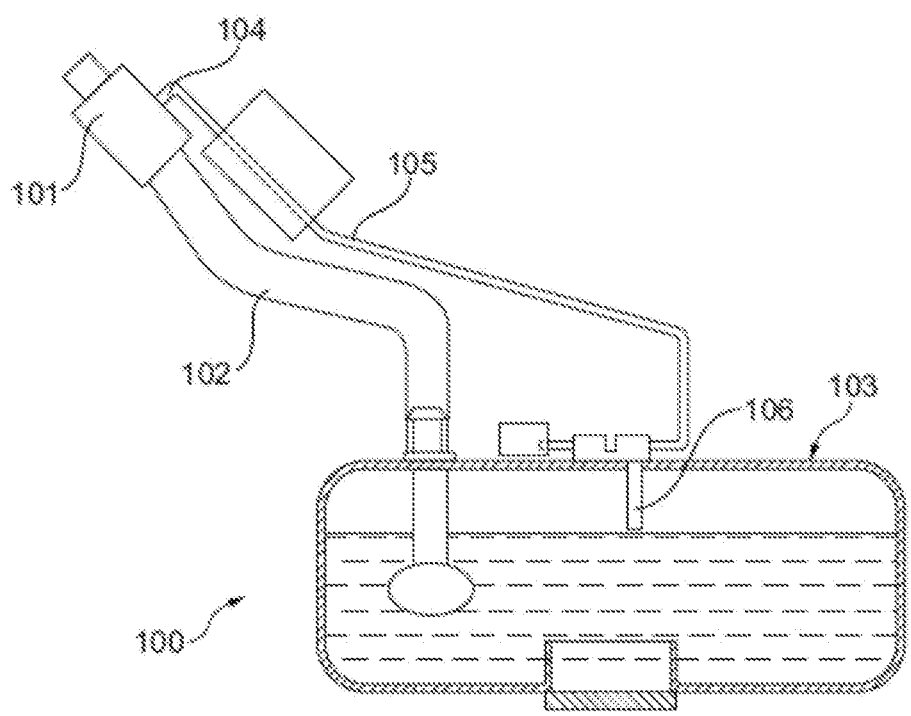
FIG. 1 shows a urea tank system in the prior art.
Figure 2:
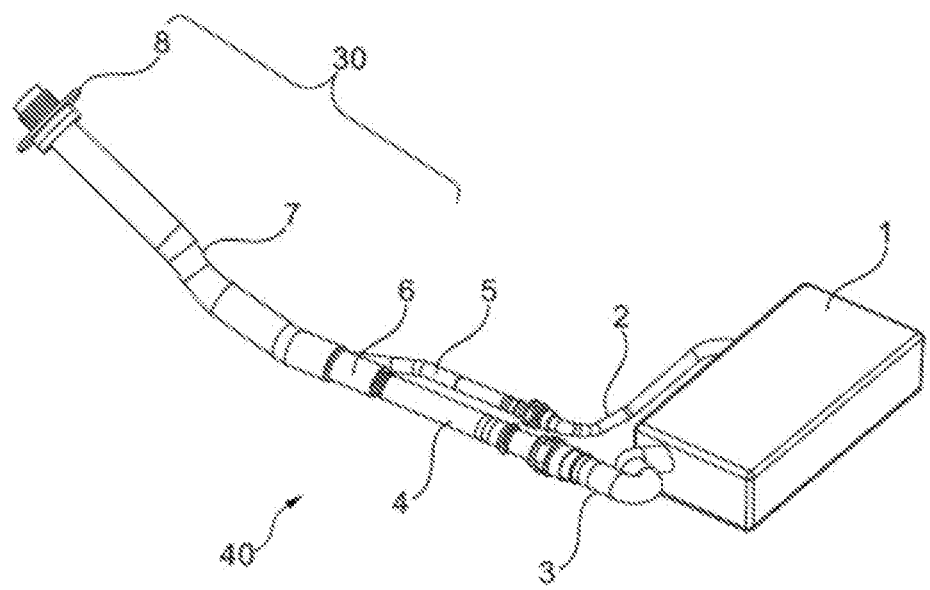
FIG. 2 is a perspective view of an exemplary urea tank system according to an embodiment of the present disclosure.
Figure 3:
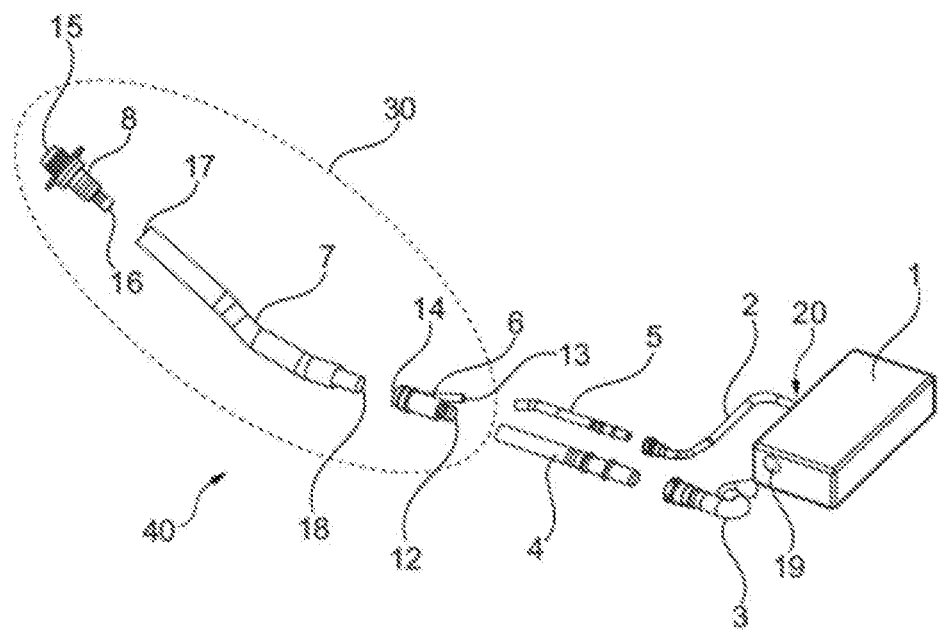
FIG. 3 is an exploded view of the urea tank system of FIG. 2. The present disclosure is mainly directed to the assembly indicated by the dotted ellipsis.
Figure 4:
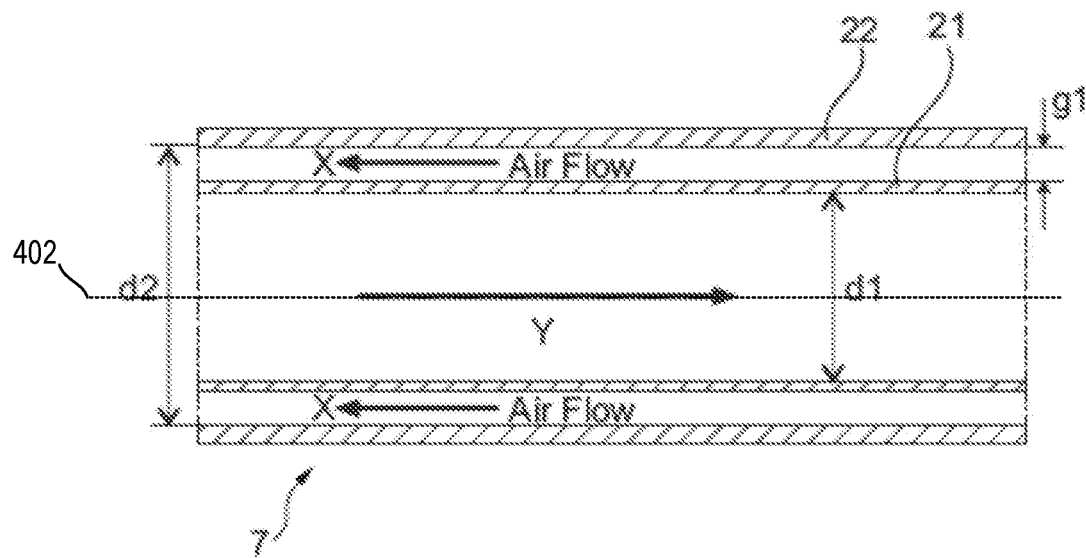
FIG. 4 shows a cross sectional view of an exemplary "coaxial tube" comprised in the assembly of FIG. 3.
Figure 5:
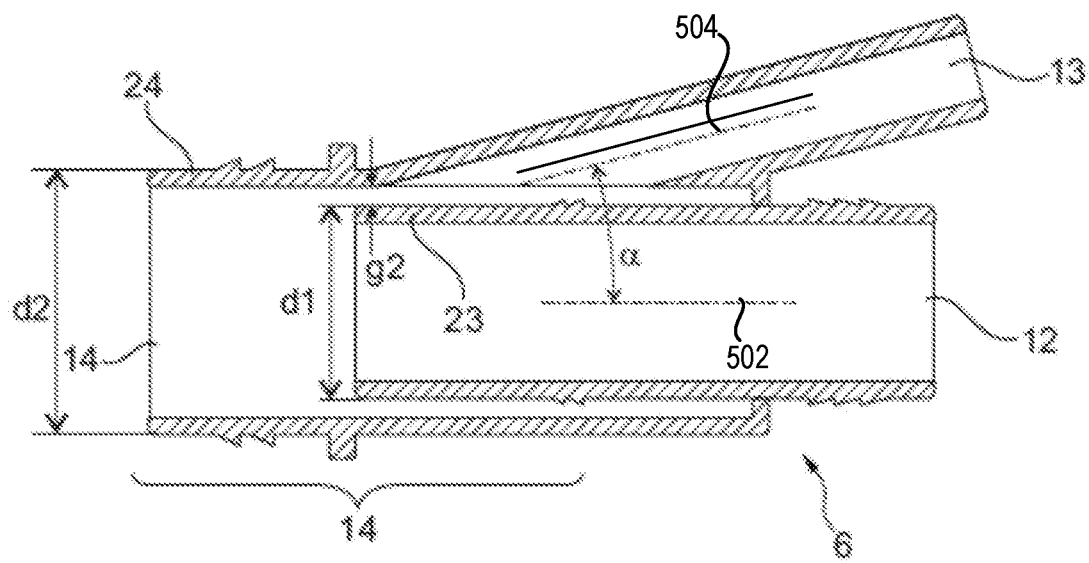
FIG. 5 shows a cross sectional view of an exemplary "adapter" comprised in the assembly of FIG. 3.
Figure 6:
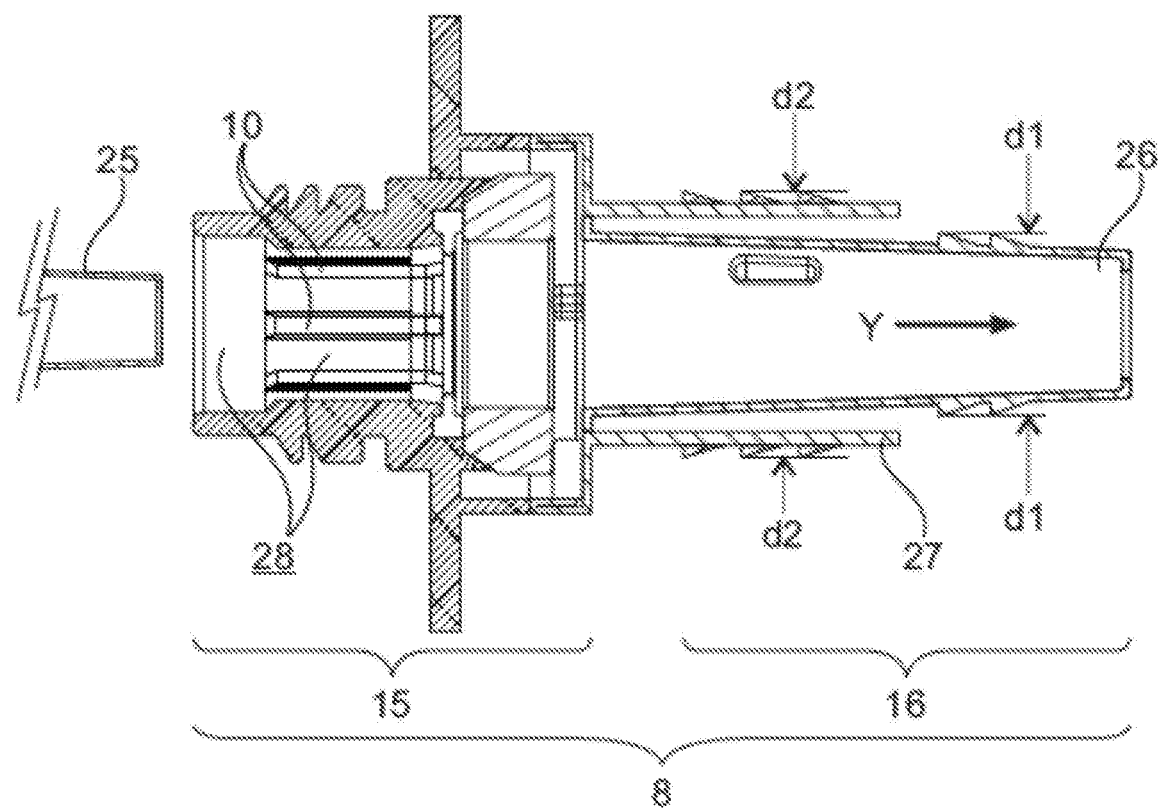
FIG. 6 shows a cross sectional view of an exemplary "filler head" comprised in the assembly of FIG. 3.
Figure 7:
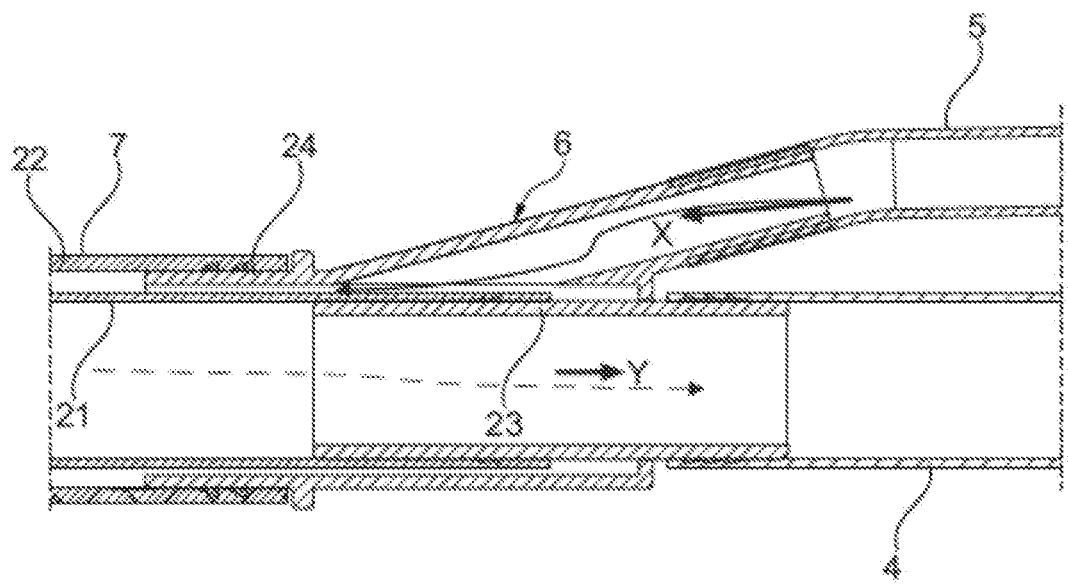
FIG. 7 shows a cross sectional view of the "adapter" of FIG. 5 during a urea refilling event, and shows the direction of gas flow, and the direction of urea flow.
Figure 8A:
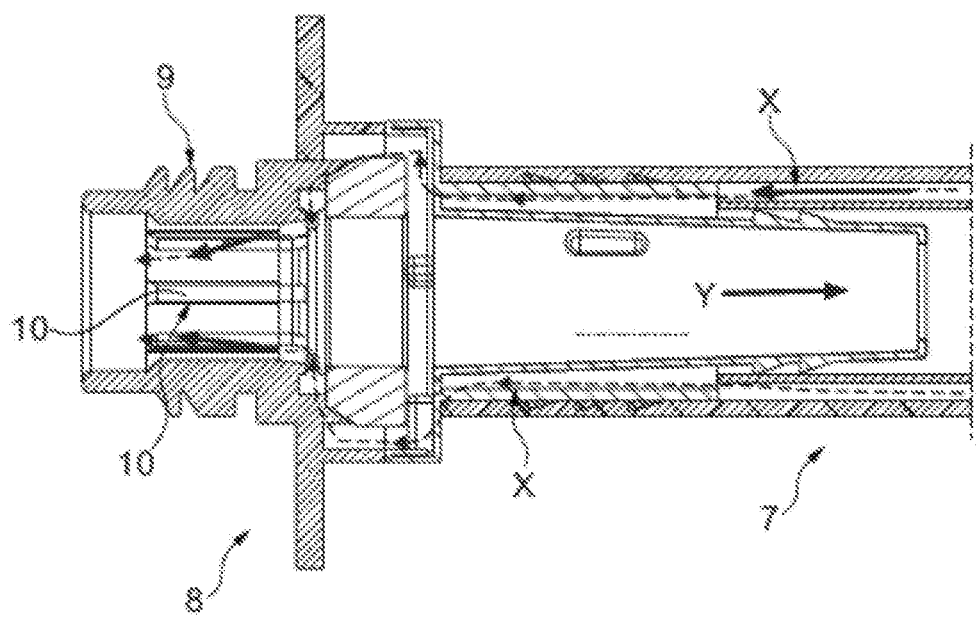
FIG. 8a shows a cross sectional view of the "filler head" of FIG. 6 during use, and shows the direction of gas flow, and the direction of urea flow.
Figure 8B:
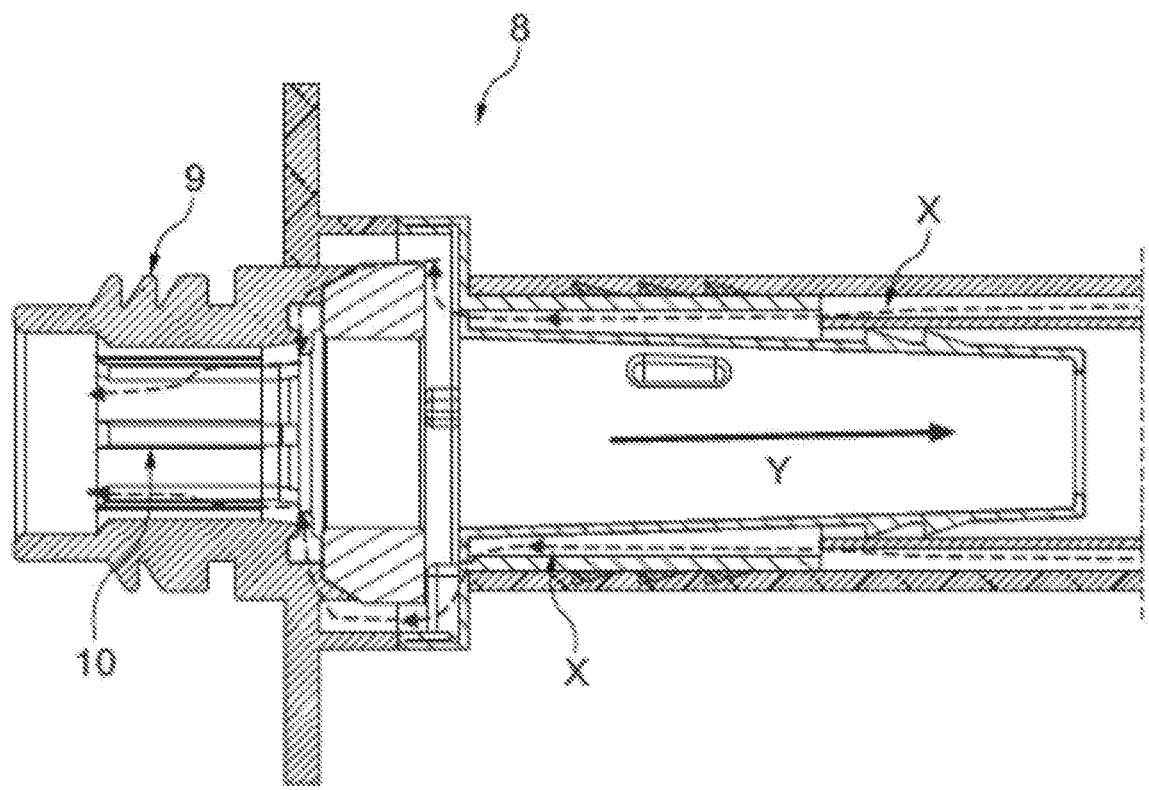

The following description relates to an assembly for a urea tank system. FIG. 1 shows a urea tank system in the prior art. FIG. 2 shows a perspective view of an exemplary urea tank system according to an embodiment of the present disclosure. FIG. 3 shows an exploded view of the urea tank system of FIG. 2. The present disclosure is mainly directed to the assembly indicated by the dotted ellipsis. FIG. 4 shows a cross sectional view of an exemplary "coaxial tube" comprised in the assembly of FIG. 3. FIG. 5 shows a cross sectional view of an exemplary "adapter" comprised in the assembly of FIG. 3. FIG. 6 shows a cross sectional view of an exemplary "filler head" comprised in the assembly of FIG. 3. FIG. 7 shows a cross sectional view of the "adapter" of FIG. 5 during a urea refilling event, and shows the direction of gas flow, and the direction of urea flow. FIG. 8a shows a cross sectional view of the "filler head" of FIG. 6 during use, and shows the direction of gas flow, and the direction of urea flow. FIG. 8b shows a cross-section view of the filler head in greater detail relative to FIG. 8a.

In one embodiment, the present disclosure discloses an assembly for use in an urea tank system, comprising a filler head and a coaxial tube and an adapter. The filler head comprises a first end with an opening, where the opening comprises a plurality of grooves for receiving urea from a filler nozzle while allowing gas to escape via the grooves. A second end of the filler head comprises an inner tubular portion for transporting the urea and an outer tubular portion for receiving the gas. The coaxial tube of the filler head comprises an inner tube for transporting the urea and an outer tube for transporting the gas. The adapter comprises a first tubular end comprising an inner tubular portion and an outer tubular portion arranged coaxially relative to one another. The inner tubular portion is connected to the inner tube of the coaxial tube and the outer tubular portion is connected to the outer tube of the coaxial tube. A second tubular end is in fluid connection with the outer tubular portion and connectable to a gas outlet of a urea tank. A third tubular end is in fluid connection with the inner tubular portion and connectable to a urea inlet of the urea tank.

By using a coaxial tube over at least a portion of the distance between the filler head on the one hand, and the urea inlet and the gas outlet of the urea tank on the other hand, the urea system is enhanced because this demands less space than two separate tubes (one for air, and one for urea having the same cross sectional area), and is easier to install (e.g. routing the single coaxial tube is easier than routing two separate tubes through openings and between obstacles). In this way difficulties in packaging two separate lines are avoided or at least reduced. This may further decrease manufacturing and labor costs associated with urea systems.

It is a further advantage of providing virtually separate paths for gas flowing out of the urea tank and urea flowing into the tank, but physically being implemented in a single coaxial tube. Said another way, while the gas path and the urea path are arranged in the same tube, fluid in the two paths does not mix, thereby rendering the two paths as functionally separate.

It is a further advantage of this assembly that the urea flow and the gas flow are kept completely separated over substantially their entire pathway. Hence, the risk of obstruction is minimal. That is to say, the urea may not block the gas flow or vice-versa.

According to a further embodiment of the present disclosure, the inner tubular portion of the filler head is tapered or conical.

It is an advantage of using an inner tubular portion with a tapered or conical shape because in this way a substantially liquid tight connection can be provided with the inner tube of the coaxial tube. Thus, the risk of spilling urea is minimized.

According to a further embodiment of the present disclosure, the coaxial tube has a length of at least 30 cm, or at least 40 cm, or at least 50 cm, or at least 60 cm.

According to a further embodiment of the present disclosure, the inner tube and the outer tube of the coaxial tube have a gap through their entire length.

According to a further embodiment of the present disclosure, a second diameter of the outer tubular portion of the filler head is at least 6 mm or at least 8 mm or at least 10 larger than a first diameter of the inner tubular portion.

In one example, a larger gap between the first and second tubular portions, which is equal to the difference between the second diameter and the first diameter, may result in a larger cross-sectional area of the annular gas channel.

According to a further embodiment of the present disclosure, the second tubular end and the third tubular end of the adapter define an angle in a range. It is to be noted that the aforementioned angle is an angle being included essentially between the longitudinal axes each defined by the longitudinal extensions of the respective second and third tubular ends.

It is an advantage of using a small angle that only a minimal amount of lateral space is used for the connection. In this way, the pressure drop is minimal, and the gas flows more smoothly. In one example, the angle is less than 45 degrees. Additionally or alternatively, the angle is less than 30 degrees. Additionally or alternatively, the angle is less than 15 degrees.

According to another advantageous embodiment of the present disclosure, the urea tank system comprises an assembly as described above including the urea tank, a gas connection tube fluidly connecting the second tubular end of the adapter and the gas outlet of the urea tank. The urea connection tube fluidly connecting the third tubular end of the adapter and the urea inlet of the urea tank.

According to a further advantageous embodiment of the present disclosure, the urea tank system further comprises an intermediate gas connection tube fluidly connected between the second tubular end of the adapter and the gas connection tube.

It is an advantage of using an (additional) intermediate gas connection tube, that a (larger) distance can be bridged in case of obstacles located in the vicinity of the gas outlet of the urea tank, while keeping the (e.g. standard) connections provided with the tank itself.

According to a further embodiment of the present disclosure, the urea tank system further comprises an intermediate urea connection tube fluidly connected between the third tubular end of the adapter and the urea connection tube.

It is an advantage of using an (additional) intermediate urea connection tube, that a (larger) distance can be bridged in case of obstacles located in the vicinity of the urea inlet of the urea tank, while keeping the (e.g. standard) connections provided with the tank itself.

According to another embodiment of the present disclosure, a filler head is provided for use in an assembly as described above, or for use in a urea tank system as described above. The filler head comprises a first end comprising an opening for receiving a filler nozzle for receiving urea, the opening further comprising a plurality of ribs or grooves configured to allow gas to escape from the filler head into the environment. A second end of the filler head comprises an inner tubular portion with a first diameter for transporting urea, and having an outer tubular portion with a second diameter larger than the first diameter for transporting gas in the space between the inner tubular portion and the outer tubular portion.

According to a further embodiment of the present disclosure, the inner tubular portion of the filler head is tapered or conical.

According to another embodiment of the present disclosure, an adapter is provided for use in an assembly as described above, or for use in the urea tank system as described above. The adapter comprises a first tubular end comprising an inner tubular portion and an outer tubular portion, the inner tubular portion and the outer tubular portion are arranged coaxially. A second tubular end is in fluid connection with the outer tubular portion, and connectable to the gas outlet of the urea tank. A third tubular end is in fluid connection with the inner tubular portion, and connectable to the urea inlet of the urea tank.

According to a further embodiment of the present disclosure, the outer tubular portion of the adapter extends beyond the inner tubular portion of the adapter and/or the second tubular end and the third tubular end of the adapter. Again, it is to be noted that the aforementioned angle is an angle being included essentially between the longitudinal axes each defined by the longitudinal extensions of the respective second and third tubular ends.

In the various figures, equivalent elements with respect to their function are provided with the same reference numerals so that these elements are usually described only once.

In this document, the term adapter refers to a connection piece or interconnection piece. In the context of the present disclosure, the adapter can also be referred to as a splitter or a combiner, as will become clear further.

FIG. 1 shows a urea tank system 100 according to a prior art example. It contains a filler head 101 with an opening for receiving a filler nozzle (not shown in FIG. 1). The opening has grooves for allowing gas to escape into the environment. The urea entering the filler head 101 flows into a urea tank 103 via filler pipe 102. As urea flows into the urea tank, gas (or air) is pressed out of the tank, and returns to the filler head 101 via return line 105, dip tube 106, and connection 104. The filler head 101 thus allows passage of the urea stream towards the tank, and allows passage of gas (or air) from the tank into the environment.

It is difficult to install the urea tank system 100 in certain motor vehicles, for example because the connection 104 forms a defined angle with the filler head, and/or because two tubes are needed, one for air and one for urea, the tubes spanning substantially the total distance between the filler head and the tank. Finding two paths between the obstructions formed by enforcements of the vehicle structure is not always easy.

Turning now to FIGS. 2, 3, 4, 5, 6, 7, 8a, and 8b, they show an embodiment of a urea tank system configured to simply a routing of a gas channel and a routing of a urea channel. The urea tank system includes a filler head 8, fluidly connected to a coaxial tube 7, fluidly connected to an adapter 6. FIGS. 2-8b are described in tandem herein.

Turning to FIG. 6, the filler head 8 has a first end 15 comprising an opening 28 for receiving a filler nozzle 25 (shown in FIG. 6) for receiving urea. The opening 28 further comprises a plurality of ribs 10 or grooves for centring the filler nozzle, and for allowing gas to escape from the filler head 8 into the environment. The filler head 8 further comprises a second end 16 having an inner tubular portion 26 with a first diameter d1 for transporting urea, and having an outer tubular portion 27 with a second diameter d2 larger than the first diameter d1 for transporting gas in the space between the inner tubular portion 26 and the outer tubular portion 27.

Turning to FIG. 4, the coaxial tube 7 tube comprises an inner tube 21 fluidly connectable to the inner tubular portion 26 of the filler head 8 for transporting urea towards the urea tank 1, and an outer tube 22 fluidly connectable to the outer tubular portion 27 of the filler head 8 for transporting gas toward the filler head 8.

Turning to FIG. 5, the adapter 6 comprises a first end 14 comprising an inner tubular portion 23 and an outer tubular portion 24. The inner tubular portion 23 and the outer tubular portion 24 are arranged coaxially relative to an axis 502. A second tubular end 13 is in direct fluid connection with only the outer tubular portion 24 and not the inner tubular portion 23. The second tubular end 13 is connectable to the gas outlet 20 of the urea tank 1 (see FIG. 3). A third tubular end 12 is in fluid connection with the inner tubular portion 23, and connectable to the urea inlet 19 of the urea tank 1.

In one example, the laterally extending connection 104 as present in the prior art system 100 according to FIG. 1 is physically spaced apart from the filler head 8 of the urea tank system 40 according to the present disclosure, allowing easier mounting of the filler head 8, as it no longer has lateral protrusions or connections related to the laterally extending connection 104.

In preferred embodiments, the coaxial tube 7 is a flexible tube. By providing a coaxial tube, only a single component needs to be routed, but, when connected between the adapter 6 and the filler head 8, it forms two distinct channels.

FIG. 2 is a perspective view, and FIG. 3 is an exploded view of the urea tank system 40. The urea tank system 40 comprises a urea tank 1 having a urea inlet port 19, and a gas outlet port 20, fluidly connected to a filler head 8 via several tubes or conduits in such a manner that urea injected via the filler head 8 flows towards and into the urea tank 1 via a first channel, and such that gas (or air) pressed out of the tank 1 flows toward the filler head 8 via a second channel, and escapes into the environment.

More specifically, the system of FIG. 2 and FIG. 3 comprises a filler head 8 (illustrated in more detail with respect to FIG. 6 and FIG. 8). The filler head 8 is fluidly connected to a coaxial tube 7 (illustrated in more detail with respect to FIG. 4). The coaxial tube 7 is fluidly connected to an adapter 6 (illustrated in more detail with respect to FIG. 5 and FIG. 7).

The adapter 6 has a first tubular end 13 fluidly connected (directly or indirectly) to the gas outlet 20 of the urea tank 1. In the example of FIG. 2 and FIG. 3, the first tubular end 13 of the adapter 6 is connected to the gas outlet port 20 via a gas discharge tube 2 (also denoted herein as a gas connection tube 2) and via an optional intermediate gas connection tube 5. In some examples, the gas discharge tube 2 and the optional intermediate gas connection tube 5 may be a single, continuous piece.

The adapter 6 further has a third tubular end 12 fluidly connected (directly or indirectly) to the urea inlet 19 of the urea tank 1. In the example of FIG. 2 and FIG. 3, the third tubular end 12 of the adapter 6 is connected to the urea inlet 19 via a urea connection tube 3 and via an optional intermediate urea connection tube 4. In some examples, the urea connection tube 3 and the optional intermediate urea connection tube 4 may be a single, continuous piece.

While not visible in FIG. 2 and FIG. 3, the gas channel and the urea channel are separated from each other, as will be explained in greater detail below.

FIG. 4 shows a cross sectional view of an exemplary coaxial tube comprised in the assembly of FIG. 3. The coaxial tube 7 comprises an inner tube 21 with a first diameter d1, and an outer tube 22 with a second diameter d2 larger than d1. The inner tube 21 defines the urea channel. The space between the inner tube 21 and the outer tube 22 (indicated by distance g1), defines the gas channel. While shown in FIG. 4 the inner tube 21 and the outer tube 22 are coaxially arranged with both of their longitudinal axes coinciding with axis 402. In some examples, the longitudinal axes of the inner tube 21 and the outer tube 22 may be misaligned with the axis 402 such that the distance g1 is not symmetric. However, it will be appreciated that the urea channel and the gas channel may still be maintained separate while providing urea and gas flows therethrough. Additionally or alternatively, one or more of the inner tube 21 and the outer tube 22 may be bent without departing from the scope of the present disclosure. During operation, the gas (or air) flows in a first direction X towards the filler head 8, and the urea flows in a second direction Y towards the urea tank 1. In one example, the gas flow may be promoted via urea filling the urea tank 1.

FIG. 5 shows a cross sectional view of an exemplary adapter comprised in the assembly of FIG. 3. The adapter 6 has a first tubular end 14 comprising an inner tubular portion 23 and an outer tubular portion 24 arranged coaxially along axis 502. The inner tubular portion 23 is connected to the inner tube 21 of the coaxial tube 7, and the outer tubular portion 24 of the adapter 6 is to be connected to the outer tube 22 of the coaxial tube 7. The adapter 6 further comprises a second tubular end 13 to be connected to the gas connection tube 2 (or intermediate gas connection tube 5). The adapter 6 further comprises a third tubular end 12 to be connected to the urea connection tube 3 (or the intermediate urea connection tube 4). In some embodiments, the first tubular end 14 and the third tubular end 12 are collinear, and the second tubular end 13 and the third tubular end 12 define an angle α measured between the axis 502 and an axis 504. In the example of FIG. 5, the outer tubular portion 24 of the adapter 6 extends beyond the inner tubular portion 23 of the adapter 6 in its longitudinal direction. While not immediately visible from FIG. 5, the urea channel and the gas channel are substantially separated from each other during operation, as will be explained in greater detail below.

FIG. 6 shows a cross sectional view of an exemplary filler head comprised in the assembly of FIG. 3. The filler head 8 has a first end 15 comprising an opening 28 sufficiently large for receiving a filler nozzle 25. The opening 28 further comprises longitudinal ribs or grooves 10 forming air channels through which gas can escape into the environment. The filler head 8 further comprises a second end 16 having an inner tubular portion 26 for transporting the urea, and an outer tubular portion 27 for receiving the gas coming from the urea tank 1. The filler head 8 is geometrically shaped such that the returning air or gas flow does not hinder the urea flow (more clearly depicted in FIG. 8a). For example, the inner tubular portion 26 of the filler head 8 is tapered or conical for providing a liquid tight connection with the inner tube 21 of the coaxial tube 7.

FIG. 7 shows a cross sectional view of the adapter of FIG. 5 during a urea refilling event, and shows the direction of gas flow X, and the direction of urea flow Y. It can be seen that the inner tube 21 of the coaxial tube 7 engages with the inner tubular portion 23 of the adapter 6, and that the outer tube 22 of the coaxial tube 7 engages with the outer tubular portion 24 of the adapter 6, thereby forming two discrete channels.

FIG. 8b shows a cross sectional view of the filler head of FIG. 6 during a urea refilling event, and shows the direction of gas or air flow X, and the direction of urea flow Y. It can be seen how the gas flow can escape to the environment via the grooves or ribs 10. In preferred embodiments, the filler head 8 has a threaded filler mouth 9 for mounting a bottle, such as e.g. Kruse bottles. FIG. 8b is an enlargement view of FIG. 8a in particular to better represent the gas or air flow X.

In one example, FIGS. 2-8b illustrate a urea tank system having a urea tank comprising a urea inlet and a gas outlet. Coaxial tubes comprising an inner tube and an outer tube comprise a gas passage arranged in a space between the inner tube and the outer tube. The gas passage fluidly coupled to the gas outlet via an angled tube. The angled tube is angled between 10 and 30 degrees relative to a shared axis of the inner tube and the outer tube. A urea passage is defined by the inner tube, wherein the urea passage is fluidly coupled to the urea inlet. As such, the urea passage is fluidly separated from the gas passage. A first end of a filler head comprises a plurality of grooves, wherein the gas passage is configured to direct gases to spaces between adjacent grooves of the plurality of grooves, and wherein a second end of the filler head comprises a conical tube configured to insert into the inner tube. A filler nozzle extends into the filler head, wherein urea flows radially interior to the plurality of grooves.

In another embodiment, FIGS. 2-8b illustrate a system, comprising a filler head comprising a plurality of grooves at a first end and a conical tube at a second end, coaxial tubes including an inner tube and an outer tube, wherein the inner tube comprises a first diameter less than a second diameter of the outer tube, wherein the conical tube is at least partially inserted into the inner tube, and where a urea inlet of a urea tank is fluidly coupled to the inner tube; and an angled tube fluidly coupled to a gas passage arranged within a gap between the inner tube and the outer tube, wherein the angled tube extends from the outer tube to a gas outlet of the urea tank.

A urea passage extends between the plurality of grooves and through the inner tube. The inner tube blocks gas in the gas passage from mixing with urea in the urea passage. The angled tube extends to a portion of the inner tube downstream of the filler head relative to a direction of urea flow. A lateral portion of the angled tube is smaller than a longitudinal portion of the angled tube. The gas passage is fluidly coupled to spaces between adjacent grooves of the plurality of grooves. The first diameter and the second diameter are uniform along an entirety of the inner tube and the outer tube. The coaxial tube has a length of at least 60 cm.

FIGS. 2-8b show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, a urea tank system comprises coaxial tubes configured to allow urea flow to a urea tank and gas flow from the urea tank to an ambient atmosphere. A packaging size of the urea system is provided via an angled adapter configured to flow gas from the urea tank to a gap between the coaxial tubes. The gap extends to a filler head, which comprises a plurality of grooves, wherein gases may exit the filler head via gaps arranged between adjacent grooves of the plurality of grooves. A urea nozzle may dispense urea into the filler head in an area radially interior to the plurality of grooves such that urea flow does not impede an exiting of the gas. The technical effect of the urea tank system is to allow gases to exit the urea tank as urea flows thereto while decreasing a packaging size of the urea tank. By doing this, the urea tank system may be easier to install and fit a wider range of vehicle compared to previous examples.

In another representation of an embodiment of a urea tank system comprises a urea tank, a gas connection tube fluidly connecting the second tubular end of the adapter and the gas outlet of the urea tank, a urea connection tube fluidly connecting the third tubular end of the adapter and the urea inlet of the urea tank.

A first example of the urea tank system further comprises where an intermediate gas connection tube is fluidly connected between the second tubular end of the adapter and the gas connection tube.

A second example of the urea tank system, optionally including the first example, further includes where an intermediate urea connection tube is fluidly connected between the second tubular end of the adapter and the gas connection tube.

A third example of the urea tank system, including one or more of the previous examples, further includes where a filler head comprises a first end comprising an opening for receiving a filler nozzle for receiving urea, the opening further comprising a plurality of ribs or grooves for allowing gas to escape from the filler head into the environment and a second end having an inner tubular portion with a first diameter for transporting urea, and having an outer tubular portion with a second diameter larger than the first diameter for transporting gas in the space between the inner tubular portion and the outer tubular portion.

A fourth example of the urea tank system, including one or more of the previous examples, further includes where the inner tubular portion of the filler head is tapered or conical.

A fifth example of the urea tank system, including one or more of the previous examples, further includes where an adapter comprises a first tubular end comprising an inner tubular portion and an outer tubular portion, the inner tubular portion and the outer tubular portion arranged coaxially, a second tubular end in fluid connection with the outer tubular portion, and connectable to the gas outlet of the urea tank, a third tubular end in fluid connection with the inner tubular portion, and connectable to the urea inlet of the urea tank.

A sixth example of the urea tank system, including one or more of the previous examples, further includes where the outer tubular portion extends beyond the inner tubular portion, and wherein the second tubular end and the third tubular end of the adapter define an angle in the range from 10° to 30°.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly for a urea tank system, comprising:
a filler head comprising an opening with a plurality of grooves at a first end, the filler head further comprising an inner tubular portion and an outer tubular portion at a second end, wherein the inner tubular portion is fluidly coupled to the opening and the outer tubular portion is fluidly coupled to spaces between grooves of the plurality of grooves;
a coaxial tube comprising an inner tube spaced away from an outer tube, wherein an interior volume of the inner tube is fluidly coupled to the inner tubular portion of the second end, and wherein a gap between the inner tube and the outer tube is fluidly coupled to the outer tubular portion of the second end;
an adapter comprising a first tubular end comprising an adapter inner tubular portion and an adapter outer tubular portion arranged coaxially and spaced apart from one another, where the adapter inner tubular portion is connected to the inner tube of the coaxial tube and the adapter outer tubular portion is coupled to the outer tube of the coaxial tube;
an angled tube is fluidly coupled to a gap arranged between the adapter inner tubular portion and the adapter outer tubular portion, wherein the angled tube is fluidly coupled to a gas outlet of a urea tank; and
a urea inlet of the urea tank is fluidly coupled to an outlet of the adapter inner tubular portion.

2. The assembly according to claim 1, wherein the inner tubular portion of the filler head is tapered or conical.

3. The assembly according of claim 1, wherein the coaxial tube has a length of at least 30 cm.

4. The assembly of claim 1, wherein the inner tube and the outer tube of the coaxial tube have constant diameters over their entire lengths.

5. The assembly of claim 1, wherein a second diameter of the outer tubular portion of the filler head is at least 10 mm larger than a first diameter of the inner tubular portion of the filler head.

6. The assembly of claim 1, wherein the angled tube is angled between 10 and 30 degrees relative to an axis of the adapter inner tubular portion and the adapter outer tubular portion.

7. A urea tank system, comprising:
a urea tank comprising a urea inlet and a gas outlet;
coaxial tubes comprising an inner tube and an outer tube, wherein a gas passage is arranged in a space between the inner tube and the outer tube; and
an adapter comprising a first tubular end comprising an inner tubular portion and an outer tubular portion, wherein the inner tube engages with the inner tubular portion and the outer tube engages with the outer tubular portion via, the adapter further comprising a second tubular end in fluid connection with the outer tubular portion and connectable to the gas outlet of the urea tank and the gas passage of the coaxial tubes between a plurality of grooves of the first tubular end and a third tubular end, wherein the third tubular end is in fluid connection with the urea inlet of the urea tank, and wherein the second tubular end is linear and angled relative to the first and third tubular ends.

8. The urea tank system of claim 7, wherein the second tubular end is angled between 10 and 30 degrees relative to a shared axis of the first tubular end and the third tubular end.

9. The urea tank system of claim 7, wherein the inner tube defines a urea passage, wherein the urea passage is fluidly coupled to the urea inlet.

10. The urea tank system of claim 7, wherein a urea passage shaped via the inner tube and the third tubular end is fluidly separated from the gas passage.

11. The urea tank system of claim 7, wherein a first end of a filler head comprises a portion of the plurality of grooves, wherein the gas passage is configured to direct gases to spaces between adjacent grooves of the plurality of grooves, and wherein a second end of the filler head comprises a conical tube configured to insert into the inner tube.

12. The urea tank system of claim 11, wherein a filler nozzle extends into the filler head, wherein urea flows radially interior to the plurality of grooves.

13. A system, comprising:
a filler head comprising a plurality of grooves at a first end and a conical tube at a second end, coaxial tubes including an inner tube and an outer tube, wherein the inner tube comprises a first diameter less than a second diameter of the outer tube, wherein the conical tube is at least partially inserted into the inner tube, and where a urea inlet of a urea tank is fluidly coupled to the inner tube; and an adapter comprising a first tubular end comprising an inner tubular portion and an outer tubular portion, wherein the inner tube engages with the inner tubular portion and the outer tube engages with the outer tubular portion, the adapter further comprising a second tubular end shaped as an angled tube in fluid connection with the outer tubular portion and connectable to a gas outlet of the urea tank and a gas passage between the inner and outer tubes, an intersection between the gas passage and the second tubular end is positioned between a plurality of grooves of the first tubular end and a third tubular end, wherein the third tubular end is in fluid connection with the urea inlet of the urea tank, wherein the second tubular end is linear and angled relative to the first and third tubular ends.

14. The system of claim 13, wherein a urea passage extends between the plurality of grooves and through the inner tube.

15. The system of claim 14, wherein the inner tube blocks gas in the gas passage from mixing with urea in the urea passage.

16. The system of claim 13, wherein the second tubular end extends to a portion of the inner tube downstream of the filler head relative to a direction of urea flow.

17. The system of claim 16, wherein a lateral portion of the second tubular end is smaller than a longitudinal portion of the second tubular end.

18. The system of claim 13, wherein the gas passage is fluidly coupled to spaces between adjacent grooves of the plurality of grooves.

19. The system of claim 13, wherein the first diameter and the second diameter are uniform along an entirety of the inner tube and the outer tube.

20. The system of claim 13, wherein the inner tube and the outer tube have a length of at least 60 cm.

* * * * *